UNITED STATES PATENT OFFICE.

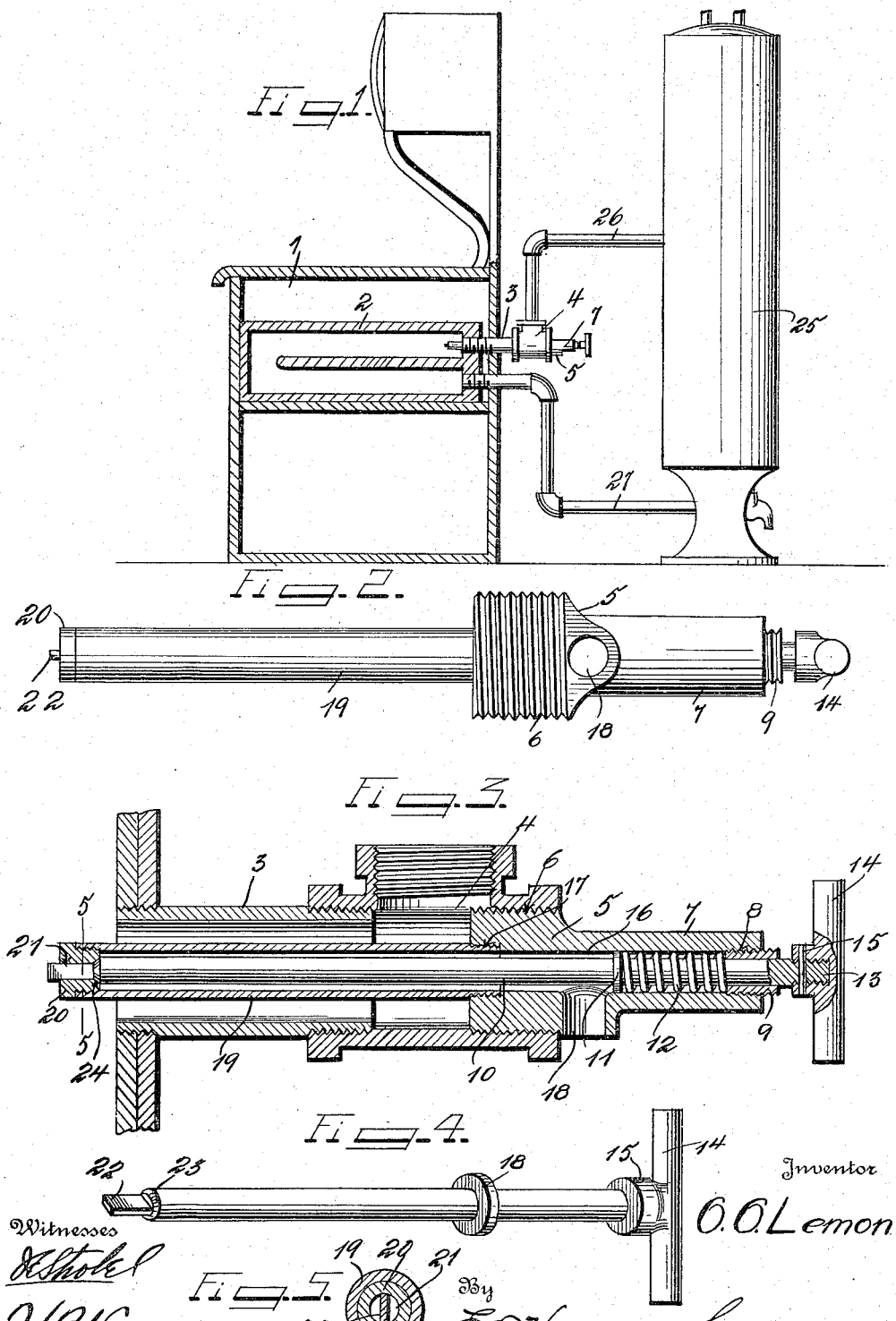

OREN O. LEMON, OF BRISTOL, VIRGINIA.

SAFETY-VALVE FOR WATER-BACKS.

1,149,272.　　　　　Specification of Letters Patent.　　Patented Aug. 10, 1915.

Application filed November 10, 1914. Serial No. 871,352.

*To all whom it may concern:*

Be it known that I, OREN O. LEMON, a citizen of the United States of America, residing at Bristol, in the county of Washington and State of Virginia, have invented certain new and useful Improvements in Safety-Valves for Water-Backs, of which the following is a specification, reference being had therein to the accompanying drawing.

This invention relates to safety valves for water backs in stoves or ranges and has for its object the production of a simple and efficient valve which will allow the escape of water under undue pressure, as for instance if the water should freeze or should become too warm.

Another object of this invention is the production of a simple and efficient valve which will automatically operate so as to allow water to be discharged therefrom without bursting the pipes or receptacles in which the water is contained provided that the water should become heated to too great a temperature or should expand by the water freezing.

With these and other objects in view this invention consists of certain novel combinations, constructions, and arrangements of parts as will be hereinafter fully described and claimed.

In the accompanying drawings: Figure 1 is a vertical section through a portion of the stove showing the device applied thereto. Fig. 2 is a bottom plan view of the valve. Fig. 3 is a longitudinal section through the valve showing the same passing through the supporting casing. Fig. 4 is a perspective view of the valve rod. Fig. 5 is a section taken on line 5—5, of Fig. 3.

By referring to the drawings it will be seen that 1 designates the stove which is provided with the usual water back 2. A pipe 3 is threaded into the water back 2 and carries a T 4. The automatic valve which comprises the principal part of the present invention is placed within the T 4 as is illustrated in Fig. 3. The automatic valve comprises a head 5 which head is externally threaded and fits in the internally threaded face of the head 4. The head 5 is provided with a projecting neck 7 which is internally threaded at its outer end as indicated at 8 in which is threaded a hollow plug 9.

A valve rod 10 is slidably mounted in the hollow plug 9, and this valve rod 10 carries a collar 11, which collar is engaged by a coil spring 12, which coil spring also engages the inner end of the plug 9 for normally urging an inward pressure upon the valve rod 10. The valve rod 10 is provided with a threaded end 13 upon which is threaded a T-shaped handle 14, the T-shaped handle being locked in engagement with the valve rod 10 by means of a transversely extending pin 15.

As is illustrated clearly in Fig. 3, the head 5 is provided with a centrally located bore 16 which is internally threaded at its inner end as indicated at 17. The bore 16 forms a communication with a discharge aperture 18 as is also clearly illustrated in Figs. 2 and 3. A sleeve 19 is threaded into the internally threaded end 17 of the head 5, and this sleeve carries an externally threaded plug 20, which plug is provided with an aperture 21 for receiving the flat tongue 22 carried by the inner end of the valve rod 10. The valve rod 10 is provided with a valve seat engaging bevel portion 23 at its inner end and is adapted to fit upon the valve seat 24 for preventing the escape of water through the sleeve 19 except when the water within the water back 2 becomes heated beyond a predetermined degree or expands owing to the fact that the water has frozen or is freezing therein.

From the foregoing description it will be seen that a very simple and efficient automatic valve has been produced which is especially adapted to be used in connection with cook stoves and the like, and it should be understood that any changes in the detail construction may be employed without departing from the spirit of the invention.

It should be understood further that when the water within the water back 2 rises above a predetermined degree of temperature, the valve rod 10 will be pushed outwardly, thereby allowing the escape of warm water or steam out through the aperture or port 18. On the other hand, if the water expands to too great an extent, which, of course, will increase the pressure within the water back, the rod 10 will be pushed outwardly and the cold water may also escape out through the port 18, and in this manner prevent the bursting of the pipes or the injury of the water back contained within the stove.

It should be further understood that providing water should freeze within the plug 20 or in the aperture 21, thereof, the ice can be readily removed therefrom by twisting the rod 10 owing to the fact that the tongue 22 will in this manner readily and easily clean out the aperture 21, thereby allowing the free operation of the valve rod 10, as soon as the fire is rebuilt in the stove and the water is again brought to its normal temperature.

It, of course, should be understood that water is not intended to be admitted into the sleeve 19 except when the rod 10 is forced inwardly, and that water contained within the water back will circulate around the sleeve 19 as will be clearly understood by carefully considering Figs. 1 and 3.

The valve can be kept clean and in working order and by turning the handle 14 every few weeks and in extreme cold weather, it is possible to determine before starting the fire whether or not the system is frozen by turning the handle and pulling the same outwardly. If the water flows freely, this will show that the pipes are not frozen. If the valve is free and works easily and the water will not run this will show that the pipes are frozen, but that the water back is not. It, of course, should be understood that it would be impossible to burst the water back no matter how hard the water may have been frozen, for the reason that the pressure cannot be raised until the ice has thawed.

As clearly illustrated in Fig. 1, the ordinary boiler 25 may be employed in connection with the present device, which boiler may be placed in communication with the water back by means of the usual communicating pipes 26 and 27.

It, of course, should be understood that it is not necessary that the tank should be located any certain or particular distance from the stove in order to be protected by the safety valve. It should not be necessary to change any part of the water system now employed in connection with ranges and the like, for all that will be necessary to do is to add a T-joint 4 in which the valve may be easily placed for accomplishing the desired result.

In view of the fact that it will not be necessary to materially change the water system, it should be understood that the present device may be applied to any water system in combination with a range or other heating device without considerable expense.

Having thus described the invention what is claimed as new, is:—

1. In a device of the class described the combination with a water back, a pipe carried thereby, a T carried by said pipe, a head carried by said T, a sleeve carried by said head, a plug carried by one end of said sleeve, said plug provided with a circular opening, a spring pressed plunger rod working through said sleeve and head and provided with a flat tongue passing through said circular aperture for normally preventing the passage of water through said sleeve and head.

2. In a device of the class described the combination with a water back, a support, a head carried by said support, said head provided with a sleeve, a threaded plug carried by the inner end of said sleeve, a threaded plug carried by said head, a spring pressed plunger engaging said first mentioned plug and normally preventing the passage of water through said sleeve and plug.

In testimony whereof I hereunto affix my signature in presence of two witnesses.

OREN O. LEMON.

Witnesses:
H. G. LAVINDER,
O. A. BUTLER.